United States Patent [19]
Kukihara

[11] Patent Number: 5,675,141
[45] Date of Patent: Oct. 7, 1997

[54] METHOD AND APPARATUS FOR AUTOMATICALLY DETECTING FOCUSING POINT AND IMAGE PROCESSING METHOD AND APPARATUS USING THE SAME

[75] Inventor: Michio Kukihara, Kodaira, Japan

[73] Assignee: Hitachi Denshi Kabushiki Kaisha, Tokyo, Japan

[21] Appl. No.: 595,306

[22] Filed: Feb. 1, 1996

[30] Foreign Application Priority Data

Feb. 3, 1995 [JP] Japan ................................. 7-017013

[51] Int. Cl.$^6$ ................................. G02B 7/09
[52] U.S. Cl. ................................. 250/201.3; 250/201.2; 348/79; 348/350
[58] Field of Search ............... 250/201.2, 201.3; 348/349, 350, 79

[56] References Cited

U.S. PATENT DOCUMENTS

| | | | |
|---|---|---|---|
| 3,721,759 | 3/1973 | Lang | 348/79 |
| 5,101,277 | 3/1992 | Kanata | 250/201.3 |
| 5,243,375 | 9/1993 | Ishida et al. | 250/201.2 |

FOREIGN PATENT DOCUMENTS

A-56-74208  6/1981  Japan.

*Primary Examiner*—Edward P. Westin
*Assistant Examiner*—Kevin Pyo
*Attorney, Agent, or Firm*—Antonelli, Terry, Stout & Kraus, LLP.

[57] ABSTRACT

A second object is disposed so that the image of the second object is formed within a picture area obtained by picking up an image of a first object, formed by a microscope, by an area sensor but at a different position from a first portion of the image of the first object. An area, that includes a second portion of the second object having the same focusing point as that of the first portion of the first object of which image is to be processed, is set as the area for detecting a focusing point. A video signal of the image within the focusing-point detecting area is extracted from a video signal from the area sensor, and a focusing point of the area sensor on the second portion of the second object is detected based on a differentiating element of the extracted video signal. Then, the detected focusing point is obtained as a focusing point of the area sensor on the first portion of the first object of which image is to be processed.

16 Claims, 13 Drawing Sheets

FIG. 1A
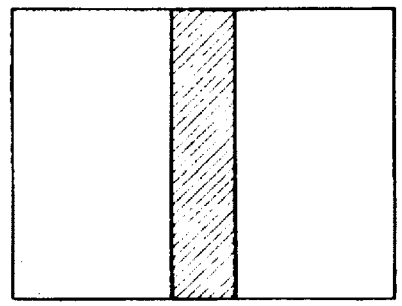
FIG. 1B
VIDEO SIGNAL
FIG. 1C
DIFFERENTIATION SIGNAL
FIG. 1D
FIG. 1E
INTEGRATION LEVEL
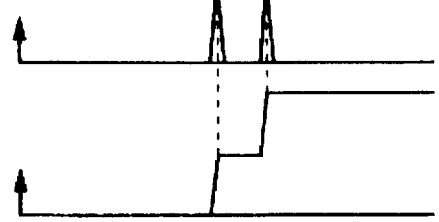
FIG. 1F
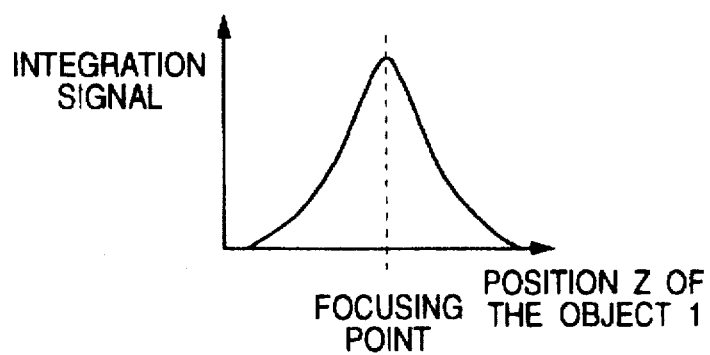

REFERENCE PATTERN

VIDEO SIGNAL

VIDEO SIGNAL
WITHIN THE AREA 17

DIFFERENTIATION
SIGNAL

INTEGRATION
SIGNAL

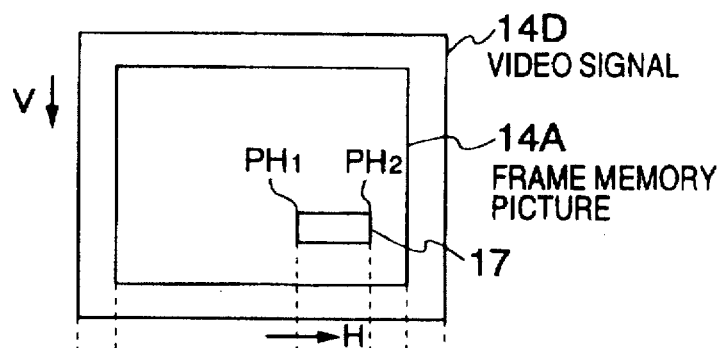
FIG. 8A
FIG. 8B
HORIZONTAL VIDEO SIGNAL
FIG. 8C
HORIZONTAL
SYNCHRONIZATION SIGNAL
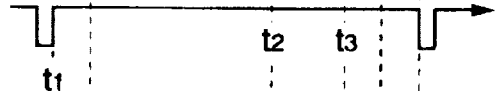
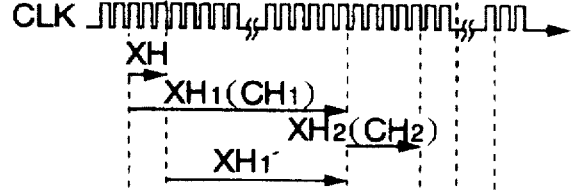
FIG. 8D
FIG. 8E
OUTPUT OF THE COUNTER 71
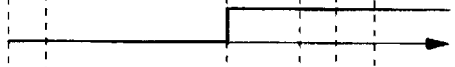
FIG. 8F
OUTPUT OF THE COUNTER 72
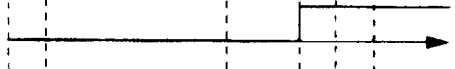
FIG. 8G
OUTPUT OF THE FLIP-FLOP 75
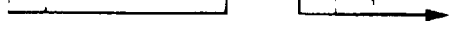

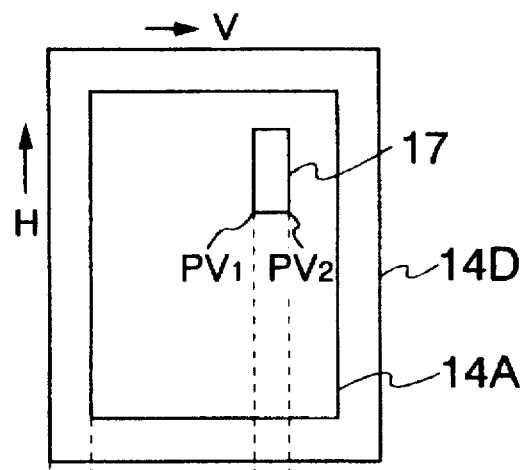
FIG. 8H
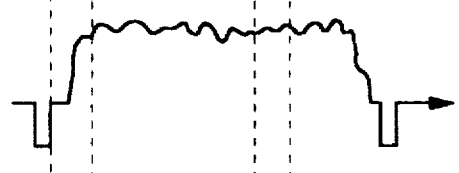
FIG. 8I
VERTICAL VIDEO SIGNAL
FIG. 8J
VERTICAL SYNCHRONIZATION
SIGNAL
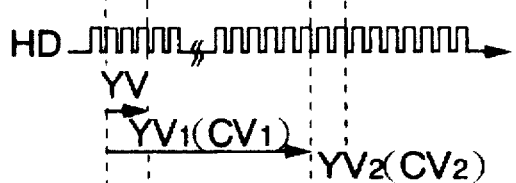
FIG. 8K
FIG. 8L
OUTPUT OF THE COUNTER 73
FIG. 8M
OUTPUT OF THE COUNTER 74
FIG. 8N
OUTPUT OF THE FLIP-FLOP 76
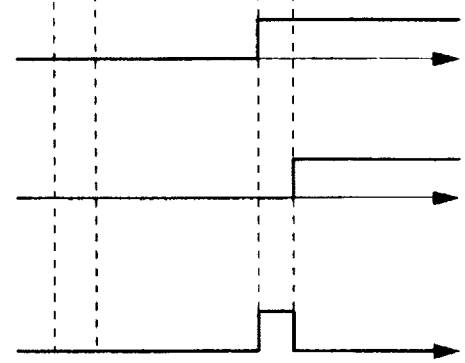

METHOD AND APPARATUS FOR AUTOMATICALLY DETECTING FOCUSING POINT AND IMAGE PROCESSING METHOD AND APPARATUS USING THE SAME

BACKGROUND OF THE INVENTION

The present invention relates to a method and an apparatus for detecting a focusing point of an object when an image of the object enlarged by a microscope is to be picked up by an area sensor, such as a television camera or the like, and relates more particularly to a method and an apparatus for carrying out an image processing such as a measuring of a size of an image of the object obtained by an image pick-up of the object by the area sensor which is disposed at the detected focusing point.

In a process of manufacturing a TFT (Thin Film Transistor) liquid crystal panel, for example, the fact that the size of a line width, etc. of a pattern of a thin film transistor formed for each picture element are measured and managed in high precision is extremely important in improving the yield and performance of the product. Accordingly, when carrying out an image processing such as a measuring of the size of an image of the object to be picked up by a combination of a microscope and a television camera, as described above, detecting an accurate focusing point of the portion to be measured is essential.

As one of prior-art techniques for detecting a focusing point, there is an automatic focusing point detecting apparatus, the so-called diffuse system, according to which a laser beam injected onto an optical axis of a microscope or a light beam reflected from an object is received by a light receiving device such as a line sensor or an area sensor loaded before or after a focusing point, and a focusing point is detected based on a light receiving range between the focusing points at the forward and backward positions of the device or by a light intensity of the received light.

Further, there is another automatic focusing-point detecting apparatus of a differentiating element extracting system which detects a luminance level difference or a differentiating element level within one screen of an image of an object obtained by a light receiving device such as a line sensor or an area sensor combined with a microscope and which detects a point where the luminance level difference becomes the most acute or a point where the differentiating element level becomes the highest as the focusing point.

The principle of the differentiating element extracting system will be explained with reference to FIGS. 1A to 1F. FIG. 1A shows a case where an image of a black object is picked up on a white ground. FIG. 1B shows a video signal waveform of the case shown in FIG. 1A. FIG. 1C shows a differentiation waveform of the signal waveform. FIG. 1D shows a waveform of the differentiation waveform which is shown in absolute values, and FIG. 1E shows an integration waveform of the waveform shown in FIG. 1D. This integration waveform shows an integration level at one point of time when a positional relation (distance) between the object of which image is picked up and an objective lens of the microscope has been changed during a focusing-point detecting operation. FIG. 1F shows a continuous change of the above integration level (the value of an integration signal V) when the position of the object with respect to the objective lens has been changed, where a position at which the integration level is the maximum is obtained as the focusing point.

SUMMARY OF THE INVENTION

According to the above-described diffuse system of the prior-art technique, when a laser beam is used, a focus is placed on a point within a spot range of the object which is illuminated by the laser beam or on a point within a range of the light receiving device which receives an intensity of the reflected light of the image of the object.

Further, according to the method of extracting a differentiating element of a picked-up image of the object, a focus is also placed on an integrated point of the differentiating element of all the range of the light receiving device that receives the reflected light of the image of the object.

Accordingly, there is no problem with these methods when the object has a plane surface. However, when the object has an uneven surface with a complex shape, it is difficult to focus on only a portion of the object to be processed when an image processing such as a size measuring or the like is to be carried out based on the image of the object.

It is an object of the present invention to provide a method and an apparatus for automatically detecting a focusing point which can eliminate the problem of the above-described prior-art techniques and a method and an apparatus for image processing using the same.

It is another object of the present invention to provide a method and an apparatus for automatically detecting a focusing point at a portion to be processed of an object even if the object has an uneven surface and a complex pattern.

It is still another object of the present invention to provide a method and an apparatus for automatically detecting a focusing point at a portion of an object to be processed even if the object has an uneven surface and a complex pattern, and for carrying out a processing of an image of the object picked up by an area sensor by disposing the area sensor at the detected focusing point.

In order to achieve the above objects, according to one aspect of the present invention, in an apparatus which has a microscope and an area sensor for picking up an image of a first object formed by the microscope and for outputting a video signal of the image of the first object and which carries out an image processing of the picked-up image of the first portion of the first object based on the video signal, a method for automatically detecting a focusing point of the area sensor on the first portion of the first object comprises the steps of (a) setting an area which includes a second portion of a second object that has the same focusing point as that of the first portion of the first object as an area for detecting a focusing point, an image of the second object being formed within the same picture area obtained by picking up the image of the first object by the area sensor but at a position different from the image of the first portion of the first object; (b) detecting a focusing point of the area sensor on the second portion of the second object based on a video signal within the focusing-point detecting area out of a video signal from the area sensor; and (c) obtaining the detected focusing point as a focusing point on the first portion of the first object of which image is to be processed by the area sensor.

According to one example of the present invention, a focusing point of the second portion of the second object is obtained by the differentiating element extracting system based on a differentiating element of the video signal of the image of the second object.

Further, according to another example of the present invention, the second object within an area for detecting a focusing point has an extremely simple structure, and has a first surface located at the same focusing point as that of the first portion of the first object to be image processed, a second surface located at a focusing point different from the first surface and only one step (a step portion) combining the first and second surfaces.

As described above, according to the present invention, an image of the area including the second portion of the second object located at the same focusing point as that of the first portion of the first object which is to be image processed such as a measuring of a size is extracted as an image of the area for detecting a focusing position, a focusing point of the second portion of the second object is detected based on the differentiating element of the video signal within the area, and the detected focusing point is obtained as the focusing point of the first portion of the first object.

Further, the second object within the area for detecting a focusing point has an extremely simple structure which can be detected with an extremely high precision when detecting a focusing point by the differentiating element extracting system. Accordingly, since the focusing point of the second object can be detected extremely easily and with high precision even if a portion of the first object to be image processed or its periphery has an uneven surface and has an extremely complex structure made of a plurality of layers, the focusing point of the portion of the first object to be image processed can be detected with extremely high precision. As a result, an image processing such as a measuring of a size can also be carried out with high precision.

BRIEF DESCRIPTION OF THE DRAWINGS

FIGS. 1A to 1F are diagrams for explaining the differentiating element extracting system in the method of automatically detecting a focusing point;

FIGS. 8A to 8N are diagrams for explaining the operation of the area detecting circuit for detecting a focusing point and the change-over signal generating circuit shown in FIG. 7;

DESCRIPTION OF THE PREFERRED EMBODIMENT

An embodiment of the present invention will be explained below with reference to the attached drawings.

Figure 2:
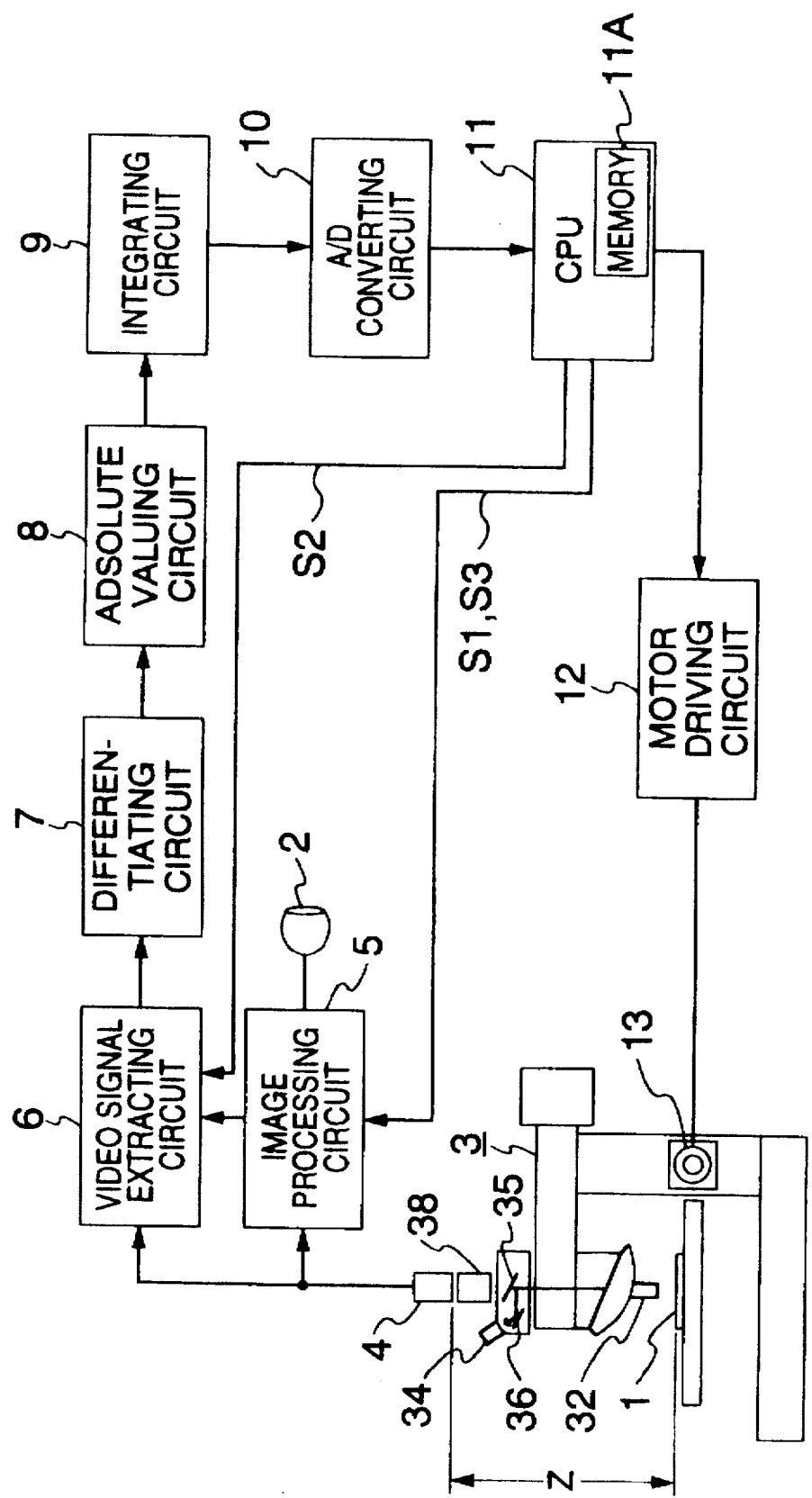
FIG. 2 is a block diagram for showing the structure of one embodiment of the image processing unit that uses the automatic focusing point detecting apparatus according to the present invention.

FIG. 2 is a block diagram for showing the structure of one embodiment of the image processing unit which uses an apparatus for automatically detecting a focusing point according to the present invention. In the present embodiment, the automatic focusing point detecting apparatus according to the present invention is applied to an image processing unit which measures a size and the like of a picked-up image of an object.

The image processing unit shown in FIG. 2 includes a microscope 3, an area sensor 4 for picking up an image of an object enlarged by the microscope 3 and converting the image into a video signal that shows an optical image, an image processing circuit 5 for processing the video signal sent from the area sensor 4, a monitor 2 connected to the image processing circuit, a video signal extracting circuit 6 for extracting a part of the video signal sent from the area sensor 4, a differentiating circuit 7, an absolute valuing circuit 8, an integrating circuit 9, an A/D converting circuit 10, a CPU 11, and a motor driving circuit 12.

Referring to FIG. 2, an image of the object 1 of which sizes are to be measured is enlarged by an objective lens 32 of the microscope 3, and the image is picked up by the area sensor, such as, for example, a television camera 4, through a half mirror 35 and an adaptor 38, and a video signal of the picked-up image is outputted from the television camera 4. The picked-up image reflected by the half mirror 35 of the microscope 3 is incident to an ocular 34 through a mirror 36.

In this case, the object 1 is a pattern formed by a plurality of layers and a gap portion between the patterns that structure a thin film transistor in a TFT type liquid crystal panel, for example. The pattern width or gap in this case is, for example, several μm to several ten μm, and, when the pattern is structured in a layer shape, the step difference between the layers is from 2 to 6 μm.

In the present embodiment, description will be made of an example of the case where the present invention is applied to the image processing unit which detects a focusing point (that is, a focusing point of the television camera 4) with respect to a predetermined area of a pattern (an area to be measured) that has a plurality of layers, for example, three layers, and has a step between the adjacent layers, controls a relative position or a relative distance of the television camera 4 from the object 1 so that the predetermined position of the television camera 4 becomes the focusing point, and the television camera is focused on this area, to thereby measure a certain size of this area.

Figure 3A:
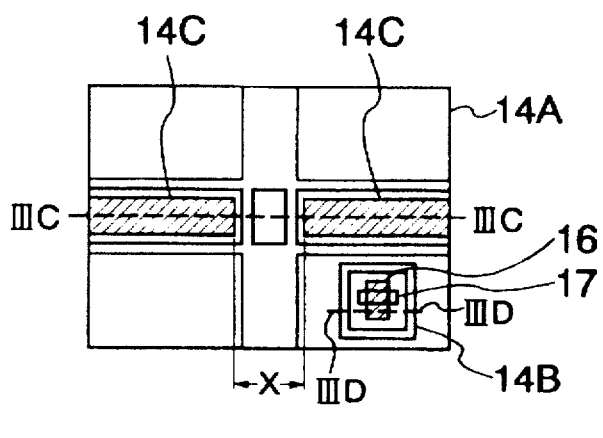
FIG. 3A is a diagram for showing a picture obtained by picking up an image of the object which is to be measured.

FIG. 3A shows a total image of an example of the object described above. A symbol mark 14A designates a total image of the object picked up by the television camera 4. In FIG. 3A, an area 14C shown by shaded lines designates a portion of the image of the object to be measured, and a shaded portion 16 within an area 14B designates a portion of the image of the object in another area which is located at the same focusing point (that is, the same distance from the television camera) as that of the area 14C. This portion 16 is an image of the object for detecting a focusing point as described later. In the present embodiment, it is assumed that a gap X between the areas 14C, for example, is measured.

Figure 3B:
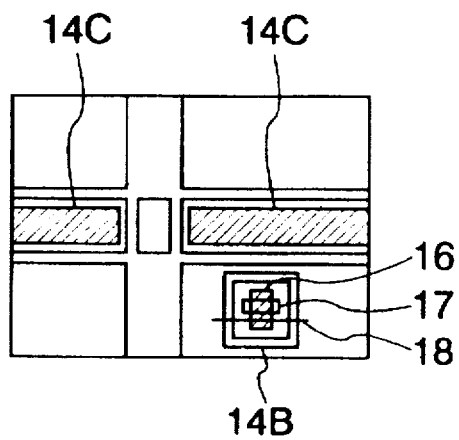
FIG. 3B is a diagram for showing a reference pattern of the object which is to be measured.
Figure 3C:
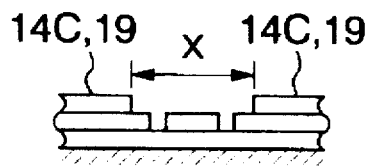
FIGS. 3C and 3D are cross sections cut along the lines of IIIC—IIIC and IIID—IIID respectively in FIG. 3A of the object shown in FIG. 3A.
Figure 3D:
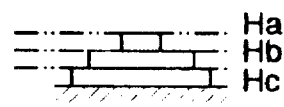
Figure 3E:
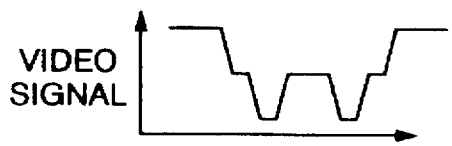
FIG. 3E is a diagram for showing a video signal of the scanning lines along the lines IIIC—IIIC of the image of the object shown in FIG. 3A.
Figure 3F:
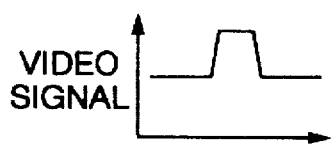
FIG. 3F is a diagram for showing a video signal of the scanning lines within the picture area for detecting a focusing point in FIG. 3A.

The operation of the image processing unit in FIG. 2 will be explained with reference to FIGS. 3A to 3G. In the image of the object shown in FIG. 3A, it is assumed that the area 14C to be measured is formed at the top portion (the top layer) of each pattern, for example. FIGS. 3C and 3D show cross sections cut along lines IIIC—IIIC and IIID—IIID respectively of the object shown in FIG. 3A. FIG. 3E shows a video signal of the scanning lines along the lines IIIC—IIIC of the image of the object shown in FIG. 3A, and FIG. 3F shows a video signal of the scanning lines within an area 17 in FIG. 3A. In FIG. 3D, Ha, Hb and Hc designate surfaces or planes (layer surfaces) of the top layer, an intermediate layer and the bottom layer, respectively.

Figure 3G:
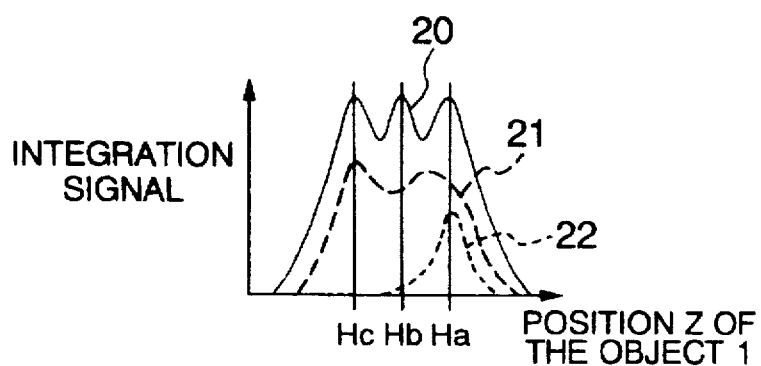
FIG. 3G is a diagram for showing a level of the integration signal for the case where an image of the object of FIG. 3A is picked up by changing a relative position of the object.

Description will be made of the case where an image of the object 1 is picked up by the focusing point detecting method according to the conventional differentiating element extracting system. Assume that the steps between the layers Ha, Hb and Hc respectively are sufficiently larger than the depth of focus of the objective lens 2. In this case, when a relative position (that is, a relative distance) Z of the object 1 with respect to the television camera 4 has been changed continuously, the level of an integration signal is expressed by a solid line waveform 20 as shown in FIG. 3G and the integration signal becomes a peak each time when the focusing point of the television camera coincides with each of the surfaces Ha, Hb and Hc. Since there are a plurality of focusing points Z at which the level of the integration signal becomes a peak, as described above, it is not always possible to focus on the area 14C to be measured even if the object is positioned at a point where the integration signal becomes a peak.

Referring to FIG. 3G, the symbol marks Ha, Hb and Hc show the positions Z where the television camera 4 is focused on the surfaces Ha, Hb and Hc.

On the other hand, in the case where the step size between the surfaces Ha and Hb is within the depth of focus, for example, the level of the integration signal becomes as shown by a dotted line waveform 21, and when the focusing point of the television camera coincides with the surface Hc, the level of the integration signal becomes a peak. However, even if the focusing point of the television camera coincides with the surfaces Hb and Ha, the peak is not obtained on these surfaces Hb and Ha but the peak is obtained at an intermediate point between these surfaces. Accordingly, in this case, the television camera 4 can not focus on the surfaces Ha and Hb, which means that the television camera can not achieve a focusing on the area 14C to be measured, which results in a failure in an accurate measuring of the size.

In order to solve the above problems, according to the present invention, an image of the area 17 which includes the relatively simple shaded area 16 located within another area 14B positioned at the same focusing point (that is, the same distance from the television camera) as that of a surface 19 in the area 14C of the object to be measured, is used as an image of the object for detecting a focusing point of the area 14C. As is clear from FIGS. 3C and 3D, the surface Ha of the area 16 within the area 17 for detecting the focusing point is positioned at the same height as that of the surface 19 of the area 14C to be measured, or at the same distance as the distance of the surface 19, from the television camera respectively. In other words, according to the present embodiment, a video signal of the area 17 for detecting the focusing point is extracted and the focusing point of the area 16 within the area 17 is detected by the differentiating element extracting system based on the extracted video signal, to thereby put a focus on the area 16. With the above arrangement, the television camera 4 can focus on the area 16 of the object and, accordingly, can focus on the area 14C to be measured as well, which enables an accurate measuring processing thereafter.

The operation of the image processing unit shown in FIG. 2 will be explained in detail.

Usually, in the image processing unit for carrying out a measuring of sizes, etc., the television camera 4 is not focused on an object 1 in the initial state of the object being mounted on the microscope 3, so that the television camera 4 can not detect a pattern of the object to be measured at this time. To cope with this situation, at first, a differentiating element is extracted from a video signal of an overall image of the object (the total image of the object) which has been picked up by the television camera according to the above-described prior-art differentiating element extracting system, and then the object 1 is moved to a position at which the differentiating element becomes a peak. Thus, a coarse focus is placed on the object.

Then, the video signal from the television camera 4 is given to the image processing circuit 5. The image processing circuit 5 has stored in the memory in advance an image of the object which is the same as the object image 14A, as a reference pattern (FIG. 3B). In response to a control signal S1 from the CPU 11, the image processing circuit 5 carries out a pattern matching processing of the object image 14A of the video signal based on the reference pattern, to thereby automatically recognize the position of the focusing-point detecting picture area 17 which includes the object area 16 for detecting the focusing point within the area 14B located in the object image 14A, and then passes the position information of the area 17 to the video extracting circuit 6. Based on this position information, the video extracting circuit 6 extracts only the video signal within the area 17 that includes the area 16 of the object image out of the video signal from the television camera 4, and passes the extracted video signal to the differentiating circuit 7. The differentiating circuit 7 detects the video signal within the extracted area 17, or the differentiating element of the shaded portion of the object image 16, and passes the detected differentiating element to the absolute valuing circuit 8 as a differentiation signal. The absolute valuing circuit 8 obtains an absolute value signal of a negative differentiating element and passes the obtained signal to the integrating circuit 9. The integrating circuit 9 integrates the absolute-valued differentiation signal, and the A/D (analog-to-digital) converting circuit 10 carries out an A/D conversion of the integration signal from the integrating circuit 9 and passes the converted result to the CPU 11.

The monitor 2 works as a display portion for monitoring the images stored in the frame memory, to be described later, of the image processing circuit 5.

The CPU 11 temporarily stores in an incorporated memory 11A a digital value of the integration signal sent from the A/D converting circuit 10. Then, the CPU 11 applies a control signal to a motor driving circuit 12, drives a focal length moving mechanism (an object moving mechanism) 13 of the microscope 3 according to a driving signal sent from the motor driving circuit 12, and moves the object 1 upwards or downwards by a predetermined distance. Then, the CPU 11 applies the control signal S1 to the image processing circuit 5 again to make the image processing circuit carry out a pattern matching processing, obtain position information of the area 17, and apply the obtained position information to the video signal extracting circuit 6. Thereafter, each of the circuits 6 to 10 carries out the same processing as described above and the digital value of the integration signal is stored in the memory 11A of the CPU 11. Thus, the above-described operation is repeated each time when the object 1 is moved upwards or downwards by a predetermined distance (a distance smaller than the step size between the layer surfaces) within a move range corresponding to a magnification of the objective lens 32. Based on the digital value of the integration signal stored in the memory 11A in the manner as described above, the position of the area 14C of the object 1 to be processed at which the A/D converted integration signal becomes the maximum value is detected and this detected position is obtained as the focusing point, within the move range corresponding to the magnification of the objective lens 32. Accordingly, when the object 1 is moved so as to position the area 14C of the object 1 at the focusing point, the television camera 4 can match the focus on the area 14C to be measured based on the area 16 for detecting the focusing point.

Figure 5A:
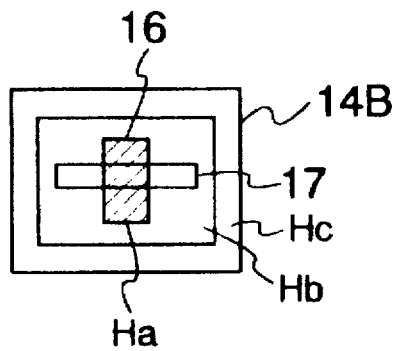
FIG. 5A is a diagram for showing an area for detecting a focusing point in FIG. 3A.
Figure 5B:
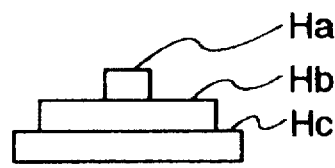
FIG. 5B is a cross section cut along the line VA—VA in the picture area for detecting a focusing point in FIG. 3A.
Figure 5C:
FIG. 5C is a diagram for showing a video signal of the area of FIG. 5A.
Figure 5D:
FIG. 5D is a diagram for showing a video signal of the picture area for detecting the focusing point in FIG. 5A.

As described above, the picture area 17 for detecting the focusing point which includes the area 16 of the object image for detecting the focusing point is the pattern that includes only one step, as is clear from FIGS. 3A and 3D and FIG. 5A. Therefore, the integration signal becomes a waveform that has only one peak as shown by a dotted line waveform 22 in FIG. 3G. As a result, by positioning the object 1 at a point where the integration signal becomes a peak, it will never fail to focus on the area 14C to be measured.

Accordingly, the conditions of the picture area 17 for detecting the focusing point are that the area 17 includes another area (surface) located at the same focusing position (that is, the same distance from the television camera) as that of the surface 19 of the area 14C of the object to be measured and still another surface of a different focusing point, and that the area 17 has only one step that combines these surfaces. These areas may be at desired positions on the picture obtained by the television camera 4 so long as these areas meet the above conditions. The surfaces within the area 17 are preferably planes.

Next, the operation of the image processing unit using the automatic focusing position detecting apparatus according to the present invention shown in FIG. 2 will be explained with reference to the flow chart shown in FIG. 4 and FIGS. 5A to 5F.

At first, at step 400, a coarse focusing processing is carried out. Since the television camera 4 is not focused on the object 1 in the initial state of the object 1 being mounted on the microscope 3 as described above, the object 1 is moved upwards and downwards in a wide range (for example, ±200 μm) to obtain the focusing point of the object 1. The coarse focusing processing will be explained by referring to FIG. 5H. In this case, it is assumed that the difference between the planes Ha and Hb is within the depth of focusing and that the integration signal level is as shown by the waveform 21 in FIG. 3G.

At first, the CPU 11 applies a control signal to the motor driving circuit 12 and positions the object 1 at a focusing point Z1 (a point at which the object 1 is most closest to the television camera). Next, the CPU 11 applies a control signal S2 to the video signal extracting circuit 6. Then, the circuit 6 applies the whole of the picked-up image of the object 1 to the differentiating circuit 7 without extracting the video signal from the television camera. Thereafter, the picked-up image is processed by the circuits 8 to 10 and a digital value Svz1 of the integration signal is stored in the memory 11A. Next, the CPU 11 positions the object 1 at a focusing point Z2 (a point at which the object 1 is positioned further away from the television camera by a predetermined distance from the focusing point Z1), and then the whole of the picked-up image of the object 1 is processed by the circuits 7 to 10 in a similar manner, and a digital value Svz2 of the integration signal is stored in the memory 11A. A similar processing is continued by sequentially moving the position of the object 1 with respect to the television camera 4 until the object 1 is positioned at a point Zmax (a point at which the object 1 is the furthest from the television camera). With the above-described processing, it becomes clear that the level of the integration signal becomes a peak at a point near a point Zc at which a focus is placed on the plane Hc and at a point near a point at which a focus is placed at an intermediate point between the planes Ha and Hb, as shown by a solid line waveform in FIG. 5H. In this example, it is assumed that a focus is placed at a point at which the level of the integration signal becomes a maximum peak. In the present embodiment, it is assumed that a light beam is being irradiated onto the object 1 from above the object 1 from a light source not shown, and accordingly the light beam reflected from the top layer Ha is the strongest among the light beams reflected from the layers Ha, Hb and Hc. Accordingly, in this case, the integration signal level is the maximum peak (Svzc) near the point Zc. Therefore, a similar processing is carried out by gradually reducing the distance of the object 1 from the point of Zmax to a point near Zc, at which it is confirmed that the level becomes the maximum peak. In other words, an integration signal level Svzc' obtained when the object 1 is positioned at a point Zc again is compared with the integration signal level Svzc obtained previously, and it is checked whether the difference between the two integration levels is less than a predetermined value Sverror. If the difference is less than the predetermined value Sverror, it is decided that the detected maximum peak is correct. If the difference is equal to or above the predetermined value Sverror, a decision is made that the detected maximum peak is not correct and the object 1 is positioned at the point Z1 again, and the process of obtaining the maximum peak is started from the beginning.

When the maximum peak (in this case, the point Zc) has been obtained as described above, the point Z is sequentially moved within a predetermined range (for example, ±3 µm) around the point Zc, and a point at which the integration signal level Svz of the video signal within the focusing-point detecting picture area 17 becomes a peak value (that is, a focusing point of the plane Ha of the area 16) is obtained.

Figure 5E:
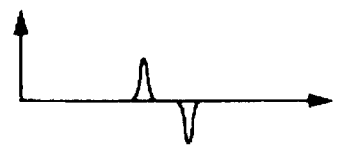
FIG. 5E is a diagram for showing a differentiation waveform of FIG. 5D.
Figure 5F:
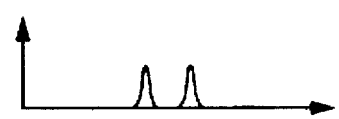
FIG. 5F is a diagram for showing a waveform of the absolute values of the differentiation waveform shown in FIG. 5E.
Figure 5G:
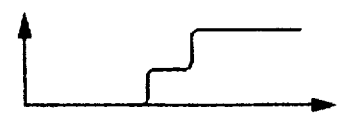
FIG. 5G is a diagram for showing an integration waveform of the signal shown in FIG. 5F.
Figure 5H:
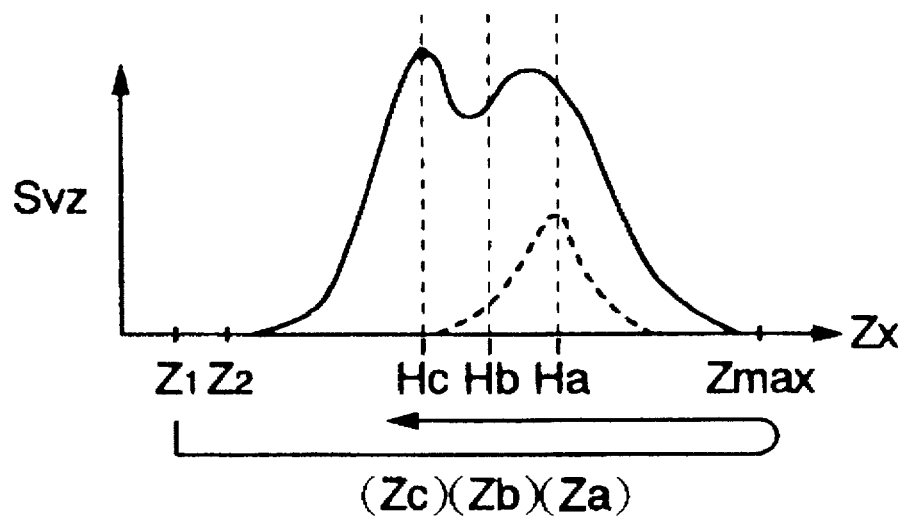
FIG. 5H is a diagram for showing a relationship between an integration signal and an object position for explaining the operation of a coarse focusing point detecting position.
Figure 5:
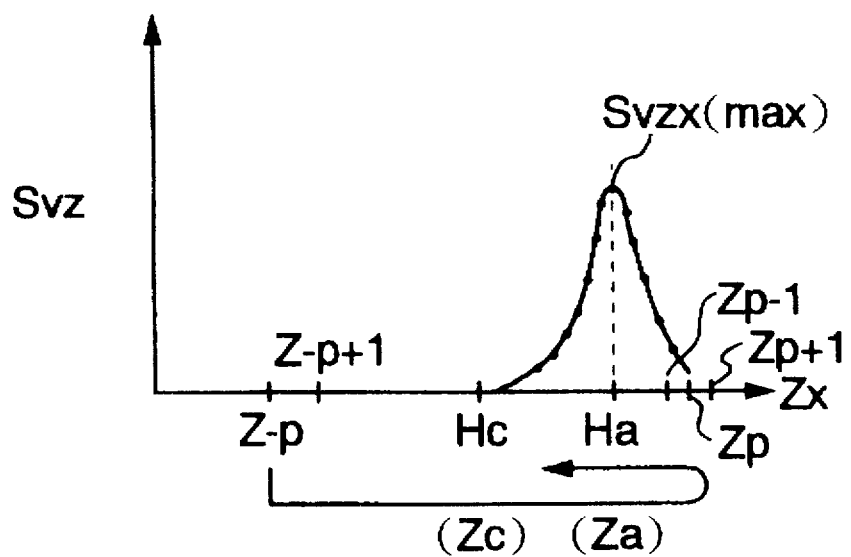
FIG. 5I is a diagram for showing a relationship between an integration signal and an object position for explaining the operation of detecting a focusing point of the focusing-point detecting area.

At first, at step 402, the CPU 11 applies a control signal to the motor driving circuit 12 and the object 1 is positioned at a point Z-p (a point at which the object 1 is positioned closer to the television camera by 3 µm, for example, from the point Zc) (refer to FIG. 5I). Next, at step 404, the CPU 11 applies the control signal S1 to the image processing circuit 5. In response to the control signal S1 from the CPU 11, the image processing circuit 5 carries out a pattern matching of the object picture 14A of the video signal based on the reference pattern, to thereby automatically recognize the position of focusing-point detecting area picture 17 including the object picture area 16 in the object picture 14A (FIG. 5A), and passes the position information of the area 17 to the video extracting circuit 6. The video extracting circuit 6 extracts only the video signal within the area 17 (FIG. 5D) out of the video signal from the television camera 4 based on the position information, and applies the extracted video signal to the differentiating circuit 7. At step 406, the differentiating circuit 7 detects the differentiating element of the extracted video signal within the area 17 and applies the detected differentiating element to the absolute valuing circuit 8 as a differentiation signal (FIG. 5E). The absolute valuing circuit 8 obtains an absolute value signal of a negative differentiating element (FIG. 5F) and applies the obtained signal to the integrating circuit 9. The integrating circuit 9 integrates the differentiation signal that has been put in an absolute value and obtains an integration signal (FIG. 5G). The A/D converting circuit 10 carries out an A/D conversion of the integration signal from the integrating circuit 9 and applies the A/D converted signal to the CPU 11. The CPU 11 stores a digital value Svzx of the integration signal, that is, Svz-p in this case, in the memory 11A (step 408).

Next, the CPU 11 controls the motor driving circuit 12 and updates the object 1 from the current position Zx to Zx+1. In this case, the object 1 is moved from the position Z-p to a position Z-p+1 (a point at which the object 1 is moved from the point Z-p away from the television camera) (refer to FIG. 5I) (step 410). Next, the processing similar to that at the steps 404 to 408 is carried out. In the manner as described above, the object 1 is sequentially moved in the downward direction (that is, in the direction away from the television camera 4) each time by a predetermined distance, thus repeating the processing of storing the integration signal level. When the processing of obtaining the integration level has been carried out by moving the object 1 to a point Zp (a point at which the object 1 is moved away from the television camera by, for example, 3 µm, from the point Zc), the waveform of the integration signal level is obtained by the data stored in the memory 11A, as indicated by a dotted line waveform shown in FIG. 5H and a solid line waveform shown in FIG. 5I. Thus, it becomes clear that a peak value Svzx (max) is located at a point Za which coincides with the plane Ha at which the focusing point from the television camera is placed.

Next, a similar processing is carried out by gradually reducing the distance of the point from the television camera from the point Zp, and it is confirmed that the integration signal level becomes a peak at a point near the point Za.

A decision is made whether the point Zx+1 which has been obtained by updating the point at the step 412 is a point Zp+1 or not, and if the point Zx+1 is the point Zp+1, the point is returned to a point Zp−1 (a point at which the object 1 is moved closer to the television camera from the point Zp) (step 414), and a processing similar to that at the steps 404 and 406 is carried out (step 416). A digital value Svzx of the integration signal thus obtained, that is, Svzp−1, is stored in the memory 11A. The point Zx is sequentially updated to Zx−1 in the similar manner (step 420), and the similar processing is carried out.

When the position of the object 1 comes to a point Za where the peak value Svzx (max) has been detected, an integration signal level Svzx (max)' at this point is obtained (step 424).

Next, the integration signal level obtained at the step 424 is compared with the integration signal level obtained at the step 413, and it is checked whether the difference between these two levels is less than the predetermined value Sverror or not (step 426), and if the difference is less than the predetermined value Sverror, a decision is made that the detected peak is correct. If the difference is equal to or above the predetermined value Sverror, a decision is made that the detected maximum peak is an error and the position is returned to Z-p again, and the processing of obtaining a peak is carried out from the beginning.

In this case, the predetermined value Sverror is a permissible error, and if this value is set at a too small value, the detection precision might improve but this might cause a hunting. Therefore, the predetermined value Sverror is finally set at a value within a range in which the precision of the measuring of a size in actual practice is permissible.

When a peak has been obtained as described above, the point Za which corresponds to the peak (that is, the point Zx (max)) becomes the focusing point of the area 16. In other words, this point becomes the focusing point of the area 14C which is to be measured. Accordingly, when the position of the object 1 is set at the focusing point Za, the television camera 4 can focus on the area 16 of the object 1, and thus can also focus on the area 14C to be measured. This ensures that the subsequent measuring processing can be carried out accurately.

At step 428, the CPU 11 controls the motor driving circuit 12 so as to position the object 1 on the focusing point Za (that is, Zx (max)). Next, at step 430, the CPU 11 sends a control signal S3 to the image processing circuit 5. The image processing circuit 5 extracts the picture of the area 14C to be measured from the video signal sent from the television camera 4, and measures the width of the gap X between the areas 14C (step 432).

Next, the structure and the operation of the image processing circuit 5 and the video change-over circuit 6 in the above-described image processing unit will be explained below with reference to the configuration diagrams in FIGS. 6 and 7 and the timing chart shown in FIG. 8.

Figure 6:
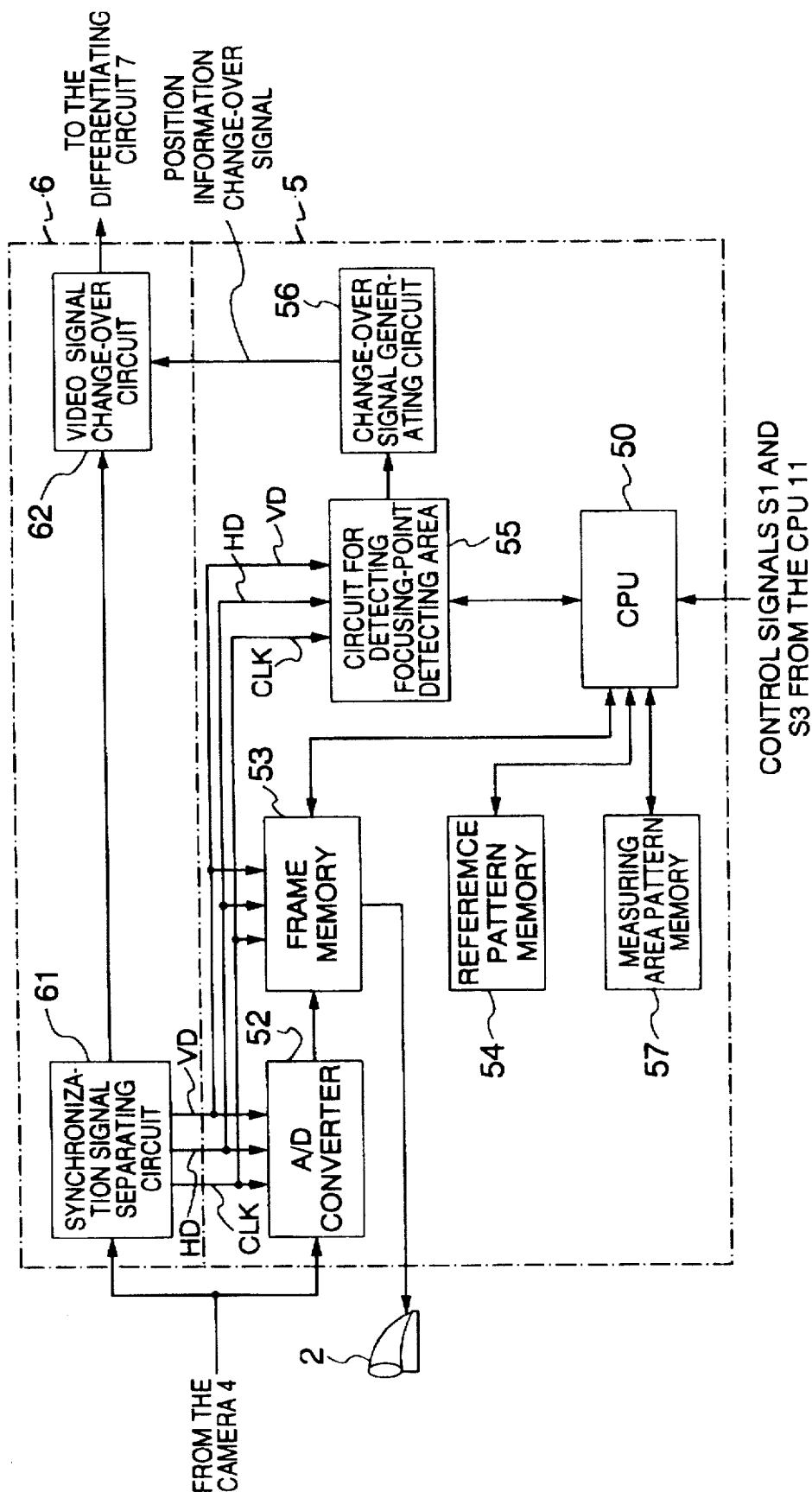
FIG. 6 is a block diagram for showing a detailed example of the configuration of the image processing circuit and the video signal extracting circuit shown in FIG. 2.
Figure 7:
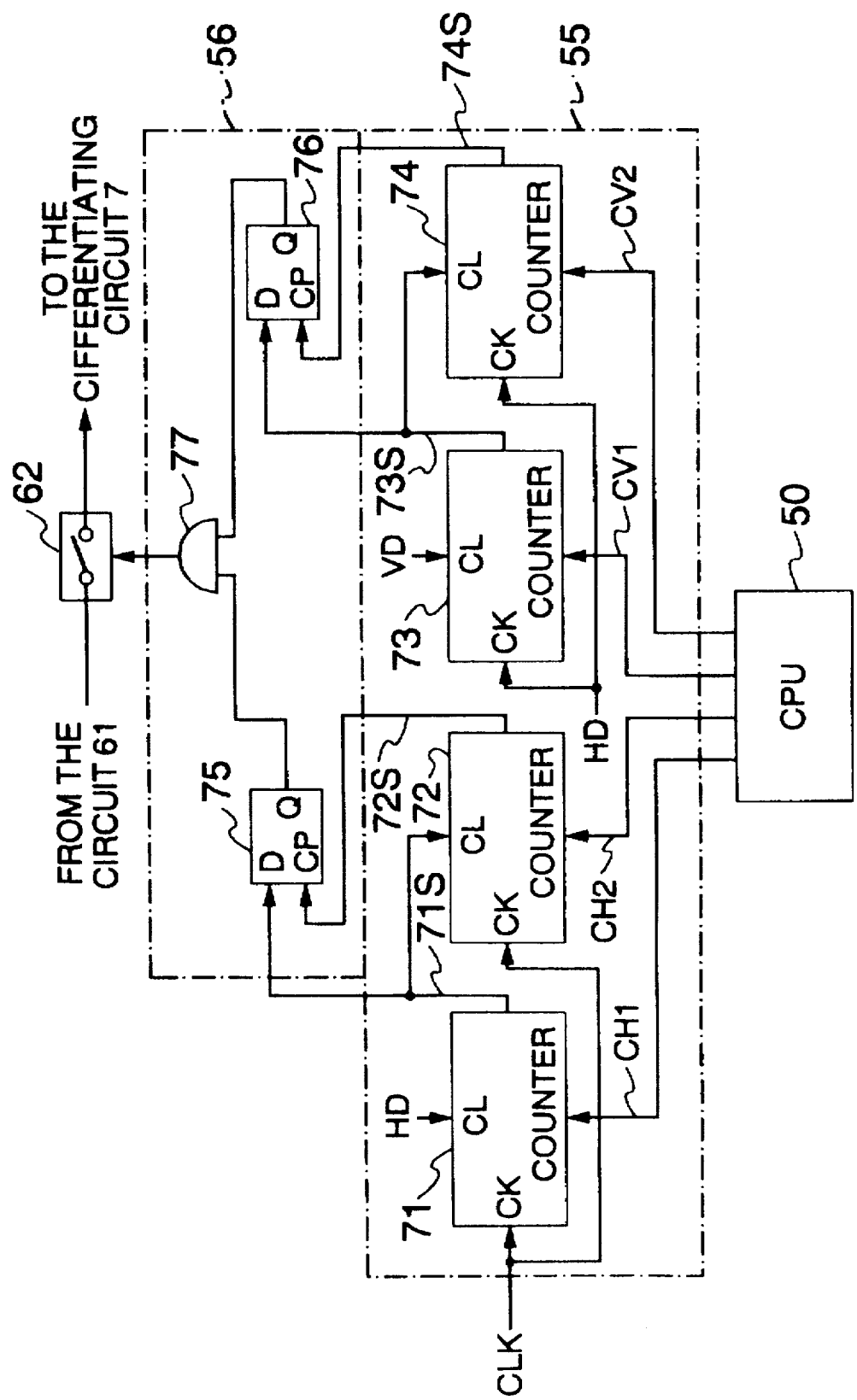
FIG. 7 is a circuit diagram for showing a detailed example of the configuration of the area detecting circuit for detecting a focusing point and the change-over signal generating circuit shown in FIG. 6.

FIG. 6 is a block diagram for showing a detailed example of the configuration of the image processing circuit and the video signal extracting circuit shown in FIG. 2, and FIG. 7 is a circuit diagram for showing a detailed example of the configuration of the area detecting circuit for detecting the focusing point and the change-over signal generating circuit shown in FIG. 6. Referring to FIG. 6, the video signal extracting circuit 6 includes a synchronizing signal separating circuit 61 for extracting a vertical synchronizing signal VD, a horizontal synchronizing signal HD and a clock signal CLK from the video signal sent from the video camera 4, and a video signal change-over circuit 62 for extracting a picture of the area 17 for detecting a focusing point from the video signal sent from the synchronizing signal separating circuit 61 according to the position information from the image processing circuit 5. The image processing circuit 5 includes an A/D converter 52 for analog/digital converting a video signal from the video camera 4 in response to the vertical synchronizing signal VD, the horizontal synchronizing signal HD and the clock signal CLK sent from the synchronizing signal separating circuit 61, a frame memory 53 for storing one screen component of the digital video signal from the A/D converter 52, a reference pattern memory 54 for storing a reference pattern (FIG. 3B) of the object image 14A, a focusing-point detecting area detecting circuit 55 for detecting the focusing-point detecting area 17 from the image within the frame memory 53, a central processing unit (CPU) 50 for carrying out a pattern matching processing between the image of the frame memory 53 and the reference pattern within the reference pattern memory 54 and for setting a set value in the focusing-point detecting area detecting circuit 55, a change-over signal generating circuit 56 for outputting position information (a change-over signal) of the focusing-point detecting area based on the output from the focusing-point detecting area detecting circuit 55, and a measuring area pattern memory 57.

As shown in FIG. 7, the area detecting circuit 55 for detecting a focusing point has, for example, four counters 71 to 74 (such as, for example, the 8-bit counter HD74HC592 manufactured by Hitachi, Ltd.), and the change-over signal generating circuit 56 has, for example, two flip-flop circuits 75 and 76 and an AND gate 77. The video signal change-over circuit 62 is a switch for selectively passing the video signal sent from the synchronizing signal dividing circuit 61 in response to the change-over signal from the AND gate 77.

Figure 9:
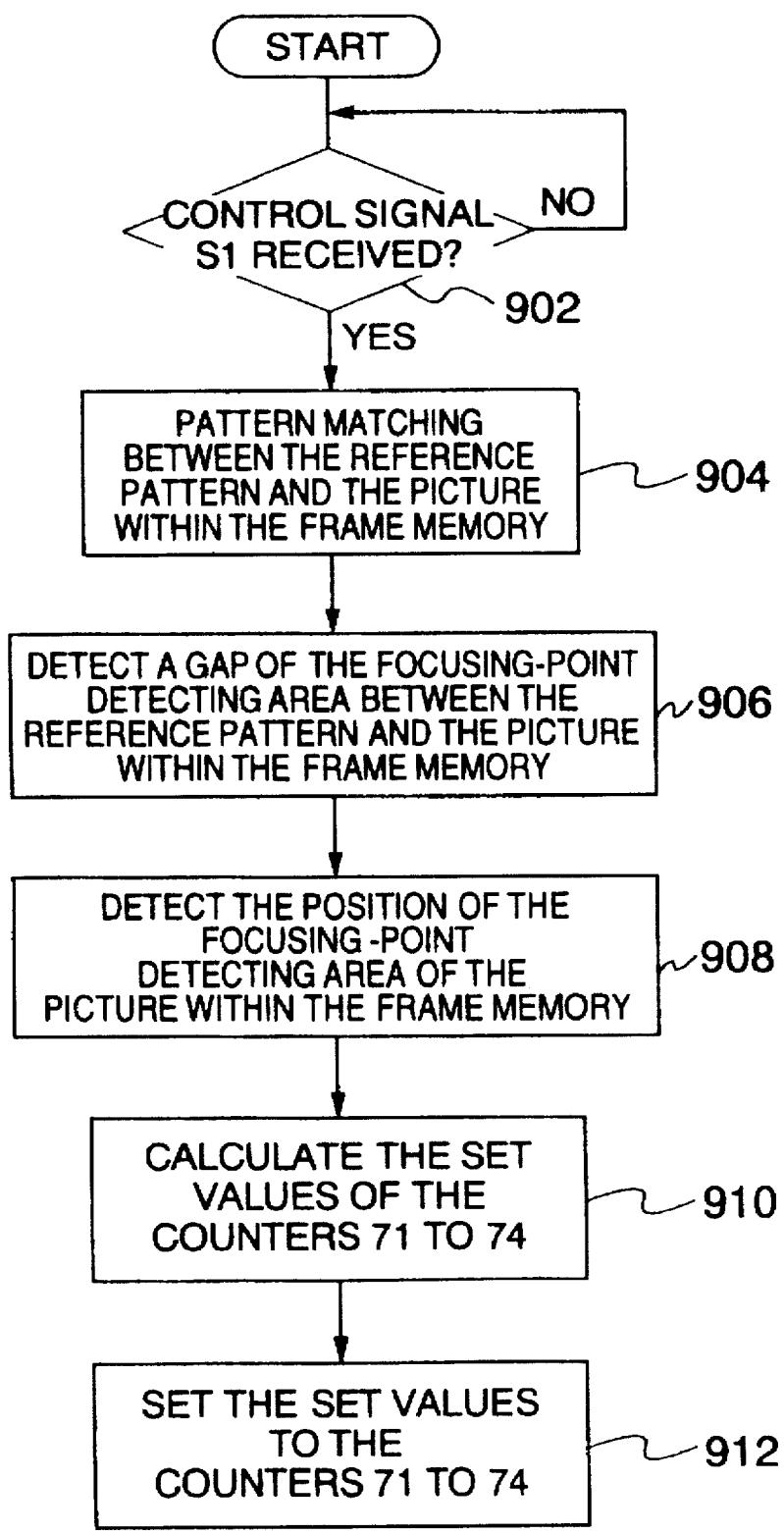
FIG. 9 is a flow chart for explaining the operation of detecting the focusing-point detecting area of the image of the object.
Figure 10:
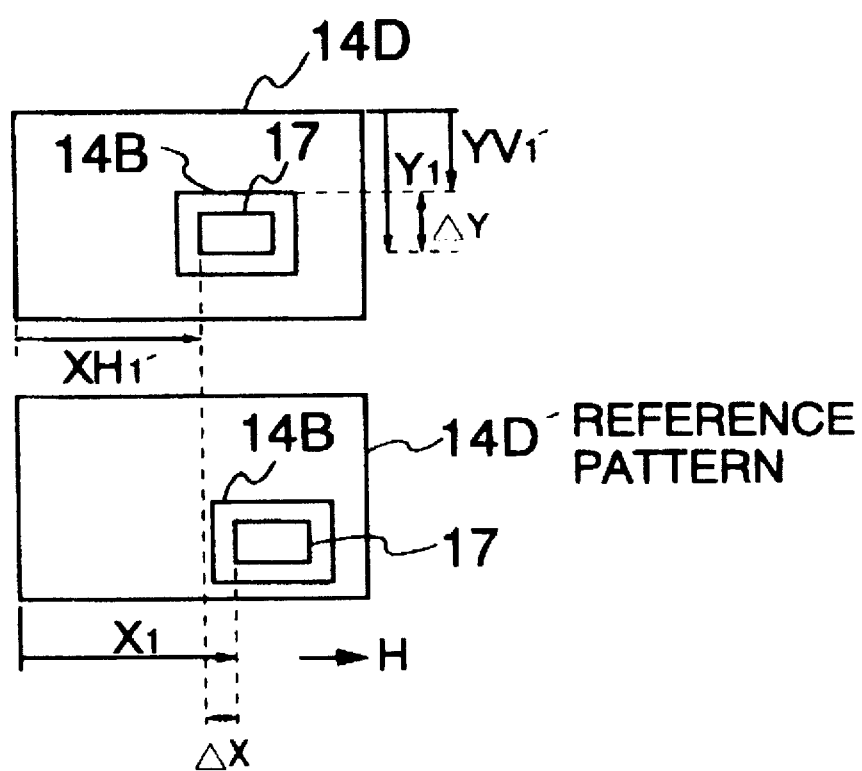
FIG. 10 is a diagram for explaining the operation of detecting the focusing-point detecting area of the image of the object.

The operation of the CPU 50 will be explained below with reference to the flow chart shown in FIG. 9 and FIG. 10.

Figure 4:
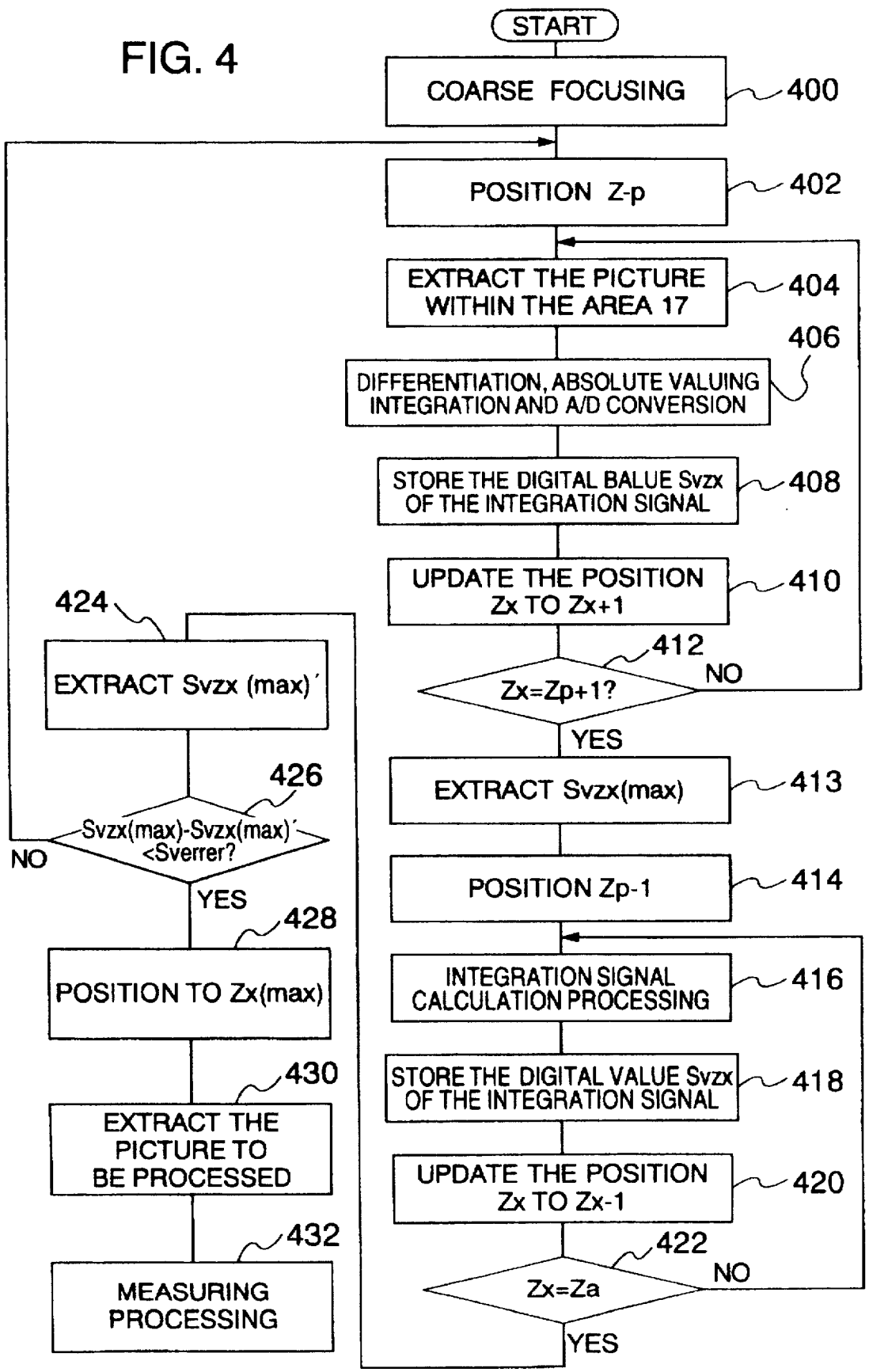
FIG. 4 is a flow chart for explaining the operation of the image processing unit shown in FIG. 2.

At first, as explained at the step 402 in FIG. 4, when the control signal S1 is applied to the CPU 50 (step 902), the CPU 50 takes in the picture (14D in FIG. 10) of the frame memory 53 and the reference pattern (14D' in FIG. 10) within the reference pattern memory 54, and carries out a pattern matching processing between these pictures, to detect a gap between the areas 14B of theses pictures, that is, a gap between the areas 17 for detecting a focusing point (more specifically, a gap ΔX in the horizontal scanning direction and a gap ΔY in the vertical scanning direction) (step 906). In this case, the point X1 for starting the horizontal scanning and the point Y1 for starting the vertical scanning of the area 17 for detecting a focusing point in the reference pattern 14D' are known, and therefore, a point XH1' for starting the horizontal scanning and a point YV1' for starting the vertical scanning of the area 17 for detecting a focusing point in the picture of the frame memory 53 can be obtained as (X1-ΔX) and (Y1-ΔY) respectively (step 908).

Next, based on the point XH1' for starting the horizontal scanning and the point YV1' for starting the vertical scanning of the area 17 for detecting a focusing point in the picture of the frame memory 53 which have been obtained as described above, a set value of each of the counters 71 to 74 is obtained (step 910) and the obtained set values are stored in the corresponding counters 71 to 74 (step 912).

The method of obtaining the set values of the counters 71 to 74 will be explained below with reference to FIGS. 8A to 8N.

A symbol mark 14D in FIGS. 8A and 8H designates a picture which is structured by the video signal from the video camera 4, and the picture 14A within the frame memory 53 is included in this picture. FIG. 8B shows a horizontal video signal corresponding to the picture 14D in FIG. 8A, and FIG. 8I shows a vertical video signal corresponding to the picture 14D. FIG. 8C shows a horizontal synchronizing signal HD extracted from the horizontal video signal in FIG. 8B, and FIG. 8J shows a vertical synchronizing signal VD extracted from the vertical video signal in FIG. 8I. FIG. 8D shows a clock pulse signal CLK of the horizontal video signal, and FIG. 8K shows a horizontal synchronizing signal HD corresponding to the vertical video signal. In the above drawings, XH2 and YV2 designate a length in the horizontal scanning direction and a length in the vertical scanning direction respectively of the area 17 for detecting a focusing point. XH and XH1 designate a distance in the horizontal direction from the starting of the horizontal synchronizing signal HD to the starting point of the picture of the frame memory and a distance in the horizontal direction from the starting of the horizontal synchronizing signal HD to a starting point PH1 of the area 17 for detecting a focusing point, respectively. Further, YV and YV1 designate a distance in the vertical direction from the starting of the vertical synchronizing signal VD to the starting point of the picture of the frame memory and a distance in the vertical direction from the starting of the vertical synchronizing signal VD to a starting point PV1 of the area 17 for detecting a focusing point, respectively. In this case, the distances XH and YV are known, and therefore, the point (distance) XH1' for starting the horizontal scanning and the point (distance) YV1' for starting the vertical scanning respectively of the area 17 for detecting a focusing point in the picture of the frame memory 53 can be obtained as (XH1-XH) and (YV1-YV) respectively.

As is clear from FIGS. 8A to 8D and 8H to 8K, the point (distance) in the horizontal direction and the point (distance) in the vertical direction of the area 17 for detecting a focusing point within the picture 14D correspond to a predetermined number of pulses of the clock pulse signal CLK (FIG. 8D) and another predetermined number of pulses of the horizontal synchronizing signal HD (FIG. 8K) respectively. In the present embodiment, the number of pulses of the clock CLK from a starting time point t1 of the horizontal synchronizing signal to a time point t2 when the horizontal video signal has reached the horizontal direction starting point PH1 of the focusing-point detecting area 17 is obtained as CH1, and the number of pulses of the clock CLK from when the horizontal video signal has started from the horizontal direction starting point PH1 of the focusing-point detecting area 17 at a time point t2 to when the horizontal video signal has reached a horizontal direction end point PH2 at a time point t3 is counted as CH2.

Similarly, the number of pulses of the horizontal synchronizing signal HD from a starting time point t4 of the vertical synchronizing signal to a time point t5 when the vertical video signal has reached the vertical direction starting point PV1 of the focusing-point detecting area 17 is obtained as CV1, and the number of pulses of the horizontal synchronizing signal HD from when the vertical video signal has started from the vertical direction starting point PV1 of the focusing-point detecting area 17 at a time point t5 to when the vertical video signal has reached a vertical direction end point PV2 at a time point t6 is counted as CV2.

Next, the operation of the area detecting circuit 55 for detecting a focusing point and the change-over signal generating circuit 56 in FIG. 7 will be explained below.

When the CPU 50 has set the set values CH1, CH2, CV1 and CV2 to the counters 71, 72, 73 and 74 respectively, as described above, these counters start the counting operation in the following manner. At first, when the horizontal synchronizing signal HD has been inputted to a trigger input CL of the counter 71, the counter 71 is reset and starts counting the pulse of the clock CLK, and when the count value has reached the set value CH1, the counter 71 sets an output signal 71S to a high level as shown in FIG. 8E. When the output signal 71S has been inputted to a trigger input CL of the counter 72, the counter 72 is reset by the starting of the trigger input and starts counting the pulse of the clock CLK, and when the count value has reached the set value CH2, the counter 72 sets an output signal 72S to a high level as shown in FIG. 8F. These output signals 71S and 72S are inputted to a D input and a clock input CP of the flip-flop 75, respectively, and accordingly, an output of the flip-flop 75 becomes a high level during a period while the horizontal video signal is located between the starting point and the end point of the focusing-point detecting area 17.

When the vertical synchronizing signal VD has been inputted to a trigger input CL of the counter 73, the counter 73 is reset and starts counting the horizontal synchronizing signal HD, and when the count value has reached the set value CV1, the counter 73 sets an output signal 73S to a high level as shown in FIG. 8L. When the output signal 73S has been inputted to a trigger input CL of the counter 74, the counter 74 is reset by the starting of the trigger input and starts counting the horizontal synchronizing signal HD, and when the count value has reached the set value CV2, the counter 74 sets an output signal 74S to a high level as shown in FIG. 8M. These output signals 73S and 74S are inputted to a D input and a clock input CP of the flip-flop 76, respectively, and accordingly, an output of the flip-flop 76 becomes a high level during a period while the vertical video signal is located between the starting point and the end point of the focusing-point detecting area 17.

The outputs of the flip-flops 75 and 76 are applied to the video signal change-over circuit 62 through the AND gate 77. Accordingly, the output of the AND gate 77 becomes a high level only during the period while the video signal from the video camera 4 is located within the focusing-point detecting area 17. The video signal change-over circuit 62 is turned on or off in response to the position information or the change-over signal which is outputted from the AND gate 77, and the video signal change-over circuit 62 is kept on while the change-over signal is at a high level so that the video signal change-over circuit applies the video signal inputted from the video camera 4 through the synchronizing signal separating circuit 61 to the differentiating circuit 7.

Figure 11:
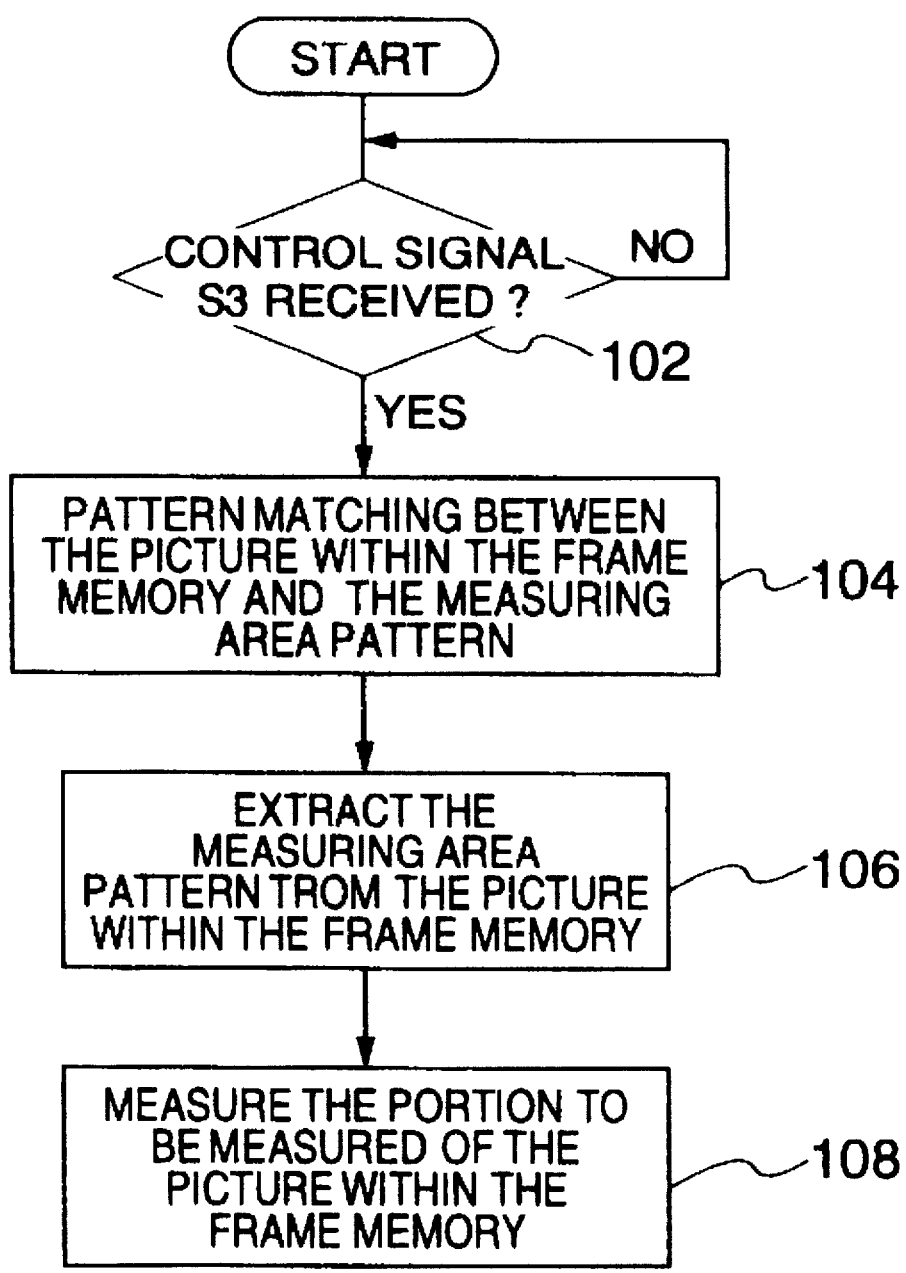
FIG. 11 is a flow chart for explaining the measuring processing operation.

The measuring processing at the step 432 in FIG. 4 will be explained next with reference to FIGS. 3A, 6 and 11. FIG. 11 is a flow chart for explaining the measuring processing operation. The measuring area pattern memory 57 in FIG. 6 stores a patten of the object to be measured, for example, the pattern of the area 14C. In response to an input of the control signal S3 (step 102), the CPU 50 pattern matches the picture within the frame memory 53 with the pattern to be measured within the measuring area pattern memory 57 (step 104) and detects the pattern of the picture to be measured within the frame memory 53 (step 106). Then, the CPU 50 measures the width of the gap X of the area 14C, for example, which is an object to be measured within the detected pattern to be measured (step 108).

In the above embodiment, the focal length moving mechanism 13 is arranged to vertically move the object. However, the focal length moving mechanism 13 may also be arranged to vertically move the television camera in stead of the object in order to change the relative distance between the object and the television camera.

Further, in the above embodiment, a focusing point is obtained by assuming that the focusing point is a distance from the television camera 4 to the object 1. However, the focusing point can also be obtained by assuming that the focusing point is a distance from the objective lens of the microscope 3 to the object 1, or the like.

When the present invention was applied to the measuring of a size of a pattern of a TFT liquid crystal panel, it has been possible to improve the measuring precision from the conventional level of 0.1 μm to 0.02 μm.

What is claimed is:

1. In an apparatus which comprises a microscope and an area sensor for picking up an image of a first object formed by said microscope and for outputting a video signal of said image of said first object and which carries out an image processing of the picked-up image of a first portion of said first object based on said video signal, a method for automatically detecting a focusing point of said area sensor on said first portion of said first object, comprising the steps of:

(a) setting an area which includes a second portion of a second object that has the same focusing point as that of said first portion of said first object as an area for detecting a focusing point, an image of said second object being formed at a position different from said image of said first portion of said first object but within the same picture area obtained by picking up said image of said first object by said area sensor;

(b) detecting a focusing point of said area sensor on said second portion of said second object based on a video signal of said focusing-point detecting area out of a video signal from said area sensor; and (c) obtaining said detected focusing point as a focusing point on said first portion of said first object of which image is to be processed.

2. A method for automatically detecting a focusing point according to claim 1, wherein said step (b) comprises:

a sub-step (b1) for changing a position of said area sensor with respect to said second portion of said second object; and a sub-step (b2) for detecting a position of said area sensor with respect to said second portion of said second object at which a video signal of said focusing-point detecting area becomes a peak value, as a focusing point on said first portion of said first object of which image is to be processed.

3. A method for automatically detecting a focusing point according to claim 2, wherein said sub-step (b2) includes, at each different position of said area sensor with respect to said second portion of said second object, a sub-step for obtaining a differentiation signal of a video signal of an image within said focusing-point detecting area, a sub-step for obtaining a signal for each of said obtained differentiation signals that have been changed into absolute values, and a sub-step for obtaining an integration signal for each of said absolute-valued signals, and said sub-step (b2) further includes a sub-step for detecting a position of said area sensor with respect to said second portion of said second object at which a value of an integration signal becomes a peak among said integration signals obtained at different positions of said area sensor with respect to said second portion of said second object, as a focusing point on said first portion of said first object of which image is to be processed.

4. A method for automatically detecting a focusing point according to claim 1, further including a step for forming said focusing-point detecting area of said second object, with a first plane structuring said second portion that has the same focusing point as that of said first portion of said first object of which image is to be processed, a second plane having a focusing point different from that of said first plane, and only one step portion which combines said first and second planes.

5. A method for carrying out an image processing of a picked-up image of a first portion of a first object, based on a video signal of said picked-up image outputted from an area sensor which has picked up said image of said first object formed by a microscope, said method comprising the steps of:

(a) setting a first area which includes a second portion of a second object that has the same focusing point as that of said first portion of said first object as an area for detecting a focusing point, an image of said second object being formed at a position different from said image of said first portion of said first object but within the same picture area obtained by picking up said image of said first object by said area sensor;

(b) detecting a focusing point of said area sensor on said second portion of said second object based on a video signal of said focusing-point detecting area out of a video signal from said area sensor;

(c) controlling a relative position between said area sensor and said first object so that a position of said first portion of said first object with respect to said area sensor becomes said detected focusing point; and (d) executing an image processing of said picked-up image of said first portion of said first object based on said video signal obtained from said area sensor, after said step (c).

6. An image processing method according to claim 5, wherein said step (b) includes:

a sub-step (b1) for changing a position of said area sensor with respect to said second portion of said second object; and a sub-step (b2) for detecting a position of said area sensor with respect to said second portion of said second object at which a video signal of said focusing-point detecting area becomes a peak value, as a focusing point on said first portion of said first object of which image is to be processed.

7. An image processing method according to claim 6, wherein said sub-step (b2) includes, at each different position of said area sensor with respect to said second portion of said second object, a sub-step for obtaining a differentiation signal of a video signal of an image of said focusing-point detecting area, a sub-step for obtaining a signal for each of said obtained differentiation signals that have been changed into absolute values, and a sub-step for obtaining an integration signal for each of said absolute-valued signals, and said sub-step (b2) further includes a sub-step for detecting a position of said area sensor with respect to said second portion of said second object at which a value of an integration signal becomes a peak among said integration signals obtained at different positions of said area sensor with respect to said second portion of said second object, as a focusing point on said first portion of said first object of which image is to be processed.

8. An image processing method according to claim 5, further including a step for forming said focusing-point detecting area of said second object, with a first plane structuring said second portion that has the same focusing point as that of said first portion of said first object of which image is to be processed, a second plane having a focusing point different from that of said first plane, and only one step portion which combines said first and second planes.

9. In an apparatus which comprises a microscope and an area sensor for picking up an image of a first object formed by said microscope and for outputting a video signal of said image of said first object and which carries out an image processing of the picked-up image of a first portion of said first object based on said video signal, an apparatus for automatically detecting a focusing point of said area sensor on said first portion of said first object, comprising:

a second object disposed so as to form an image of said second object at a position different from said image of said first portion of said first object but within the same picture area obtained by picking up said image of said first object by said area sensor;

means for extracting a video signal of an image within a focusing-point detecting area that includes a second portion of said second object having the same focusing point as that of said first portion of said first object of which image is to be processed, based on a video signal from said area sensor;

means for detecting a focusing point of said area sensor on said second portion of said second object, based on a video signal of a picture within said focus-point detecting area; and means for outputting said detected focusing point as a focusing point of said area sensor on said first portion of said first object of which image is to be processed.

10. An apparatus for automatically detecting a focusing point according to claim 9, wherein said means for detecting a focusing point comprises:

means for changing a position of said area sensor with respect to said second portion of said second object; and peak value detecting means for detecting a point of said area sensor with respect to said second portion of said second object at which a video signal of a picture within said focusing-point detecting area becomes a peak value, and outputting said detected point as a focusing point on said first portion of said first object of which image is to be processed.

11. An apparatus for automatically detecting a focusing point according to claim 10, wherein said peak values detecting means includes:

a differentiating circuit for obtaining, at each different position of said area sensor with respect to said second portion of said second object, a differentiation signal of a video signal of an image within said focusing-point detecting area;

an absolute valuing circuit for obtaining a signal for each of said obtained differentiation signals that have been changed into absolute values;

an integrating circuit for obtaining an integration signal for each of said absolute-valued signals, and means for detecting a position of said area sensor with respect to said second portion of said second object at which a value of an integration signal becomes a peak among said integration signals obtained at different positions of said area sensor with respect to said second portion of said second object, as a focusing point of said first portion of said first object of which image is to be processed.

12. An apparatus for automatically detecting a focusing point according to claim 9, wherein said focusing-point detecting area of said second object is formed by a first plane structuring said second portion that has the same focusing point as that of said first portion of said first object of which image is to be processed, a second plane having a focusing point different from that of said first plane, and only one step portion which combines said first and second planes.

13. An apparatus comprising a microscope and an area sensor for picking up an image of a first object formed by said microscope and for outputting a video signal of said image of said first object and which carries out an image processing of said picked-up image of a first portion of said first object based on said video signal, further comprising:

a second object disposed so as to form an image of said second object at a position different from said image of said first portion of said first object but within the same picture area obtained by picking up said image of said first object by said area sensor;

means for extracting a video signal of a picture within a focusing-point detecting area that includes a second portion of said second object having the same focusing point as that of said first portion of said first object of which image is to be processed, based on a video signal from said area sensor;

means for detecting a focusing point of said area sensor on said second portion of said second object, based on a video signal of a picture within said focusing-point detecting area;

means for controlling a relative position between said area sensor and said first object so that a position of said first portion of said first object with respect to said area sensor becomes said detected focusing point; and means for carrying out an image processing of said picked-up image of said first portion of said first object based on a video signal obtained from said area sensor, after said relative positioning control.

14. An image processing apparatus according to claim 13, wherein said means for detecting a focusing point comprises:

means for changing a position of said area sensor with respect to said second portion of said second object; and peak detecting means for detecting a position of said area sensor with respect to said second portion of said second object at which a video signal of a picture within said focusing-point detecting area becomes a peak value, and for outputting said detected position as a focusing point on said first portion of said first object of which image is to be processed.

15. An image processing apparatus according to claim 14, wherein said peak value detecting means includes:

a differentiating circuit for obtaining, at each different position of said area sensor with respect to said second portion of said second object, a differentiation signal of a video signal of a picture within said focusing-point detecting area;

an absolute valuing circuit for obtaining a signal for each of said obtained differentiation signals that have been changed into absolute values;

an integrating circuit for obtaining an integration signal for each of said absolute-valued signals; and means for detecting a position of said area sensor with respect to said second portion of said second object at which a value of an integration signal becomes a peak among said integration signals obtained at different positions of said area sensor with respect to said second portion of said second object, as a focusing point on said first portion of said first object of which image is to be processed.

16. An image processing apparatus according to claim 13, wherein said focusing-point detecting area of said second object is formed by a first plane structuring said second portion that has the same focusing point as that of said first portion of said first object of which image is to be processed, a second plane having a focusing point different from that of said first plane, and only one step portion which combines said first and second planes.

* * * * *